United States Patent [19]
Weaver

[11] 3,750,475
[45] Aug. 7, 1973

[54] FLUID PRESSURE MONITORING SYSTEM

[75] Inventor: Preston R. Weaver, Rocky Hill, Conn.

[73] Assignee: UMC Electronics Company, North Haven, Conn.

[22] Filed: Aug. 3, 1972

[21] Appl. No.: 277,602

Related U.S. Application Data

[63] Continuation-in-part of Ser. No. 60,429, Aug. 3, 1970.

[52] U.S. Cl. ............................................. 73/398 AR
[51] Int. Cl. .............................................. G01l 9/00
[58] Field of Search ..................... 73/398 R, 398 AR, 73/88.5 SC, 88.5 R, 119, 118

[56] References Cited
UNITED STATES PATENTS
3,698,249  10/1972  Weaver............................ 73/398 R Primary Examiner—Donald O. Woodiel
Attorney—Robert H. Montgomery et al.

[57] ABSTRACT

This specification discloses an apparatus for measuring pressure in a tubular line without interruption of the line, comprising a pair of spaced apart arms; a bridging member extends between the arms and is constructed and arranged to flex upon expansion of a line clamped between the arms on one side of the bridging member, and a transducer effective to produce a signal which varies as a function of a force applied thereto is supported on one of the arms on the other side of the bridging member while a force transmitting member is carried on the other of the arms on the other side of the bridging member.

10 Claims, 7 Drawing Figures

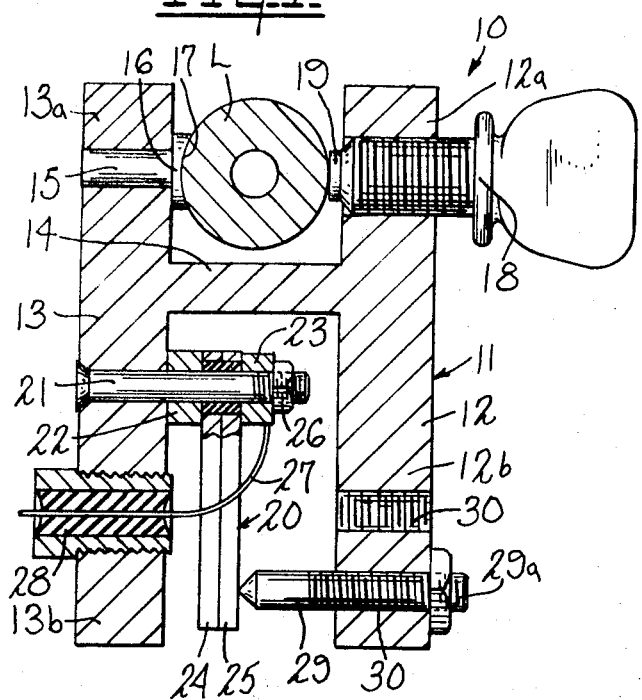
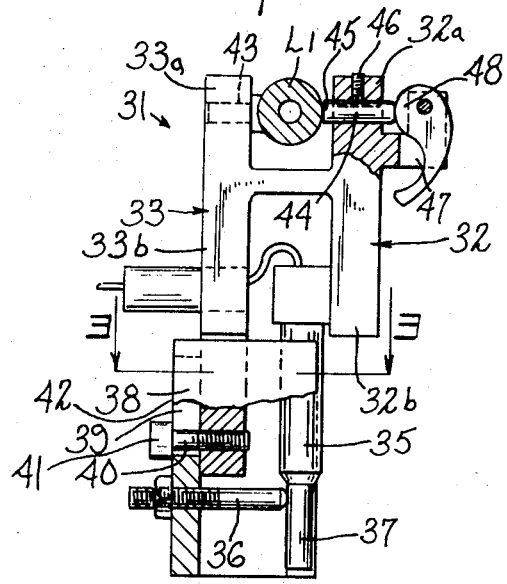
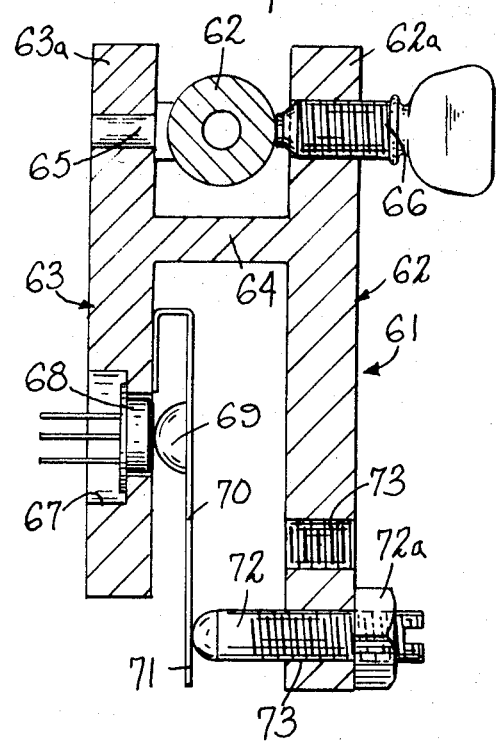
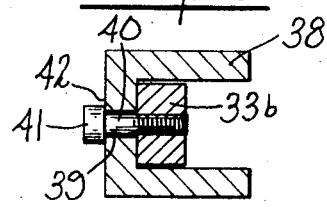

FLUID PRESSURE MONITORING SYSTEM

This application is a continuation-in-part of co-pending application Ser. No. 60,429, filed Aug. 3, 1970.

This invention relates to pressure measuring apparatus and more particularly relates to apparatus for measuring pressure and/or changes in pressure in a fluid line without interrupting the line.

The aforementioned co-pending application, now U. S. Pat. No. 3,698,249, discloses a transducing arrangement adapted to be coupled to a fluid line without interruption of the line and measure pressure and/or change of pressure in the line due to expansion of the line. That transducing arrangement comprises a housing member defining two pairs of relatively rigid spaced arms on either side of a relatively flexible bridging member. One pair of arms defines a line-receiving passage therethrough with walls defining the passage engaging the wall of the line. A mechanical force or movement-to-electric signal transducer is disposed between the other pair of arms. Upon expansion of the line due to pressure therein the bridging member may flex and permit the arms to deflect. Such deflection is then sensed by the transducer. This arrangement has proven to be very rugged and accurate, and provides the further advantage of amplification of mechanical movement and, hence, high signal output.

The present invention provides improvements over the structure described above in increasing the signal output of the transducer, and also for rapidly coupling and removing the device from a line. Briefly stated, the invention in one form thereof comprises a device of the type described having a transducing element which is carried on one arm of a pair and is adapted to emit a signal proportional to movement or pressure from a co-operating element carried on the other arm of the pair. Either the transducer or the cooperating element may be moved relative to the other to vary the point of contact and, hence, mechanical amplification of the movement of the passage providing arms. The invention further provides quick attach and release coupling means to facilitate coupling to and release release from a line.

An object of this invention is to provide a new and improved device of the type described.

Another object of this invention is to provide a device of the type described having new and improved means for varying the amplification thereof.

A further object of this invention is to provide a device of the type described having new and improved line coupling and release means.

The features of the invention which are believed to be novel are particularly pointed out and distinctly claimed in the concluding portion of this specification. The invention, however, both as to its organization and operation, together with further objects and advantages thereof, may best be appreciated by reference to the following detailed description taken in conjunction with the drawings, wherein:

FIG. 1 is an elevation in half section of a device embodying the invention;

FIG. 2 is an elevation partially cut away exemplifying the invention;

FIG. 3 is a view seen in the plane of lines 3-3 of FIG. 2;

FIG. 5 is an elevation in half section of another device embodying the invention.

Figure 4:
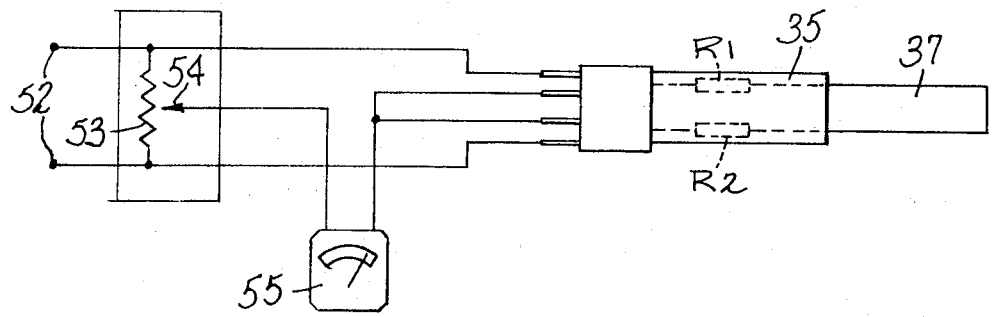
FIGS. 4 and 4a are schematic diagrams of the transducing element of FIG. 2.

A transducer arrangement 10 embodying the invention in one form thereof is shown in FIG. 1 and comprises a housing member or frame 11 generally H-shaped having spaced apart arms 12 and 13. A bridging member 14 joins and spaces arms 12 and 13 at opposite ends of the bridging member. The bridging member is intermediate the ends of the arms 12 and 13 and defines upper and lower arm portions 12a, 12b, 13a and 13b. The bridging member 14 is of lesser cross-sectional dimension than the arms and is constructed and arranged to flex and permit deflection of arms 12 and 13. The arms 12a and 13a define a passage therethrough for a fluid conduit or line L and carry line-coupling means for clamping the housing member to the line or tube L. The coupling means comprises a line-seating member 15 having a head portion 16 providing a surface 17 which is complementary to the surface of the line to be monitored. As shown, surface 17 is concave to seat the tubular line therein. A releasable clamping means in the form of a thumb screw 18 is threaded through arm 12a and contains a line contact portion 19 which provides a clamping surface. A transducing element 20 is supported in a cantilever fashion on a stud 21 carried in arm 13b. A sleeve 22 is disposed about stud 21. A contact member 23 is also carried by stud 21 in contact with the transducer 20. In this embodiment of the invention the transducer 20 is a piezoelectric transducer of the sandwich type which comprises two piezoelectric elements 24 and 25. Element 24 is ground through spacer 22 while element 25 is engaged by contact member 23. The overall assembly is maintained in a fixed position on stud 21 by a nut 26 threaded on stud 21. This particular type of transducer is well known to those skilled in the art and will provide an electrical output which varies with its mechanical deflection. Such transducers are available from the piezoelectric division of Clevite Corp. under the trademark "Bi-Morph." The signal output will be taken off between a lead 27 extending through an insulating member 28 from contact member 23.

A force-producing member in the form of a bolt or stud 29 is threadably received in a passage 30 in the lower arm 12b and secured in position as by means of a nut 29a thereon. The force-producing member may be prepositioned with respect to its contact or degree of contact with element 25.

Upon expansion of the line L due to fluid pressure therein, an outward deflecting force on the upper arms 12a and 13a is produced which results in bending moments in bridging portion 14, flexing thereof an inward deflecting force on the lower arms 12b and 13b.

Frame member 11 is sized and dimensioned with respect to the pressure range which it will measure in that it will always operate within its stress strain characteristics within the linear portion of such characteristics, and below its elastic limit. The stiffness of the arms in relation to bridging portion 14 is determined by relative dimensioning. For this purpose the housing member of frame 11 may be of cold rolled steel and the seating insert 15 may be of brass.

This construction provides an extremely rugged transducing element which is easily adjustable and which may be easily mounted to a line and removed therefrom. The mechanical amplification factor may be varied by providing a plurality of threaded passages 30 for member 29.

To protect the crystal, a generally U-shaped cover member, as shown in the aforesaid co-pending application may be fastened over the front and back of the frame closing the space between arms 12b and 13b. A signal conditioning network, as shown in FIG. 8 of said patent, may be utilized in conjunction with the device of FIG. 1.

In practice, the device as shown in FIG. 1 may have a height of only approximately three-fourths of an inch and three-eighths of an inch in width when acting upon a line of one-fourth inch outside diameter.

It is preferred that the dimension between the center of the bridging portion 14 and the center of the line L be no greater, and preferably lesser, than the dimension between the center of bridging member 14 and the point of contact of member 29 on element 25, so that mechanical amplification may be obtained, if desired. This will, of course, depend upon the desired application of the transducing element.

FIG. 2 exemplifies another embodiment of the invention which is adapted to measure static pressures in a line L1. This arrangement comprises a frame member 31 which is again generally of an H-shape, arms 32 and 33 spaced apart by a bridging member 34 having its ends attached to arms 32 and 33 intermediate the ends thereof and defining upper arms 32a and 33a, and lower arms 32b and 33b. In this arrangement, force responsive transducer 35, as hereinafter described, is carried on arm 32b and extends essentially parallel thereto. Arm 32b is longer than arm 33b below the bridging portion 34 and carries thereon a force-producing member in the form of a stud 36 contacting portion 37 of transducer 35. Force-producing member 36 is carried in a generally U-shaped frame 38, as more clearly shown in FIG. 3. Member 38 has a slot 39 therein through which passes the shank 40 of a bolt which is threadably received in lower arm portion 33b of arm 33. The head 41 of the bolt engages surface 42 of member 38. With this construction, member 38 may be vertically positioned on arm 33 and vary the point of contact of member 36 on transducer 35. As will hereinafter be made apparent, this will mechanically vary the moment produced on member 37 and permit selection of mechanical amplification of the deflection of arms 32 and 33.

Arm 33a on the upper side of bridging portion 34 carries a removable and changeable insert 43 constructed in the manner previously described. A quick release clamping means is provided in the form of a contact member 44 carried in arm 32a which may have an end 45 providing a surface (not shown) complementary to the peripheral surface of line L1. Member 44 is limited to only linear motion as by means of a set screw 46 extending through the top edge of arm 32 into a slot in member 44. An extension 47 on arm 32a pivotally mounts a cam clamping member 48. Member 48 is shown in the full clamping position with line L1 in the passage defined by arms 32a and 33a. To release the member 31 from line L1, the member 48 is pivoted counterclockwise, as illustrated, allowing member 44 to slide to the right as viewed in FIG. 2 and rapidly release member 31 from the line.

Figure 4A:
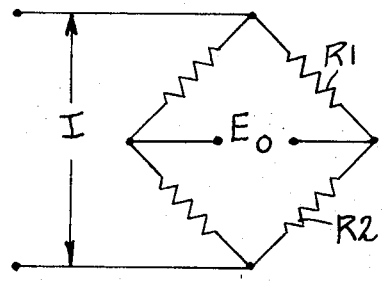

The transducer 35 is exemplified in FIG. 4 and comprises a cartridge-like member with a cantilevered flexure portion 37 coupled to resistance strain sensors R1 and R2 which form two legs of a Wheatstone bridge, as exemplified in FIG. 4a. Input excitation voltage is applied across terminals 52 and across a balancing potentiometer 53 having an adjustable tap 54 for balance purposes. A voltage readout device 55, which may be calibrated in units of pressure, is connected between tap 54 and the junction of strain sensing resistors R1 and R2. Transducers of this type are marketed by Imperial Controls of Seattle, Washington.

With this arrangement, it may be seen that the stress on the sensors R1 and R2 will be a function of the position of contact of member 36 along flexure portion 37. Upon expansion of the line L1 due to pressure therein, bridging portion 34 will flex as arms 32 and 33 deflect resulting in flexure of member 37 and the application of strain to the sensors R1 and R2. The device may be initially arranged so that there is a pre-bias or deflection on member 37 to give output voltage for a given pressure in line L1.

The voltage output $E_o$ at the readout device 55 may be expressed as $E_o = E_t C (1 + x) e$ where $E_t$ = excitation voltage
$C$ = constant dependent on resistance values
$X$ = distance from end of flexure member to point of input in inches, and
$e$ = deflection input at $x$ in inches By varying the point of contact of member 36 on flexure member 37, signal output may be varied dependent on the mechanical amplification of the deflection of arms 32 and 33.

FIG. 5 exemplifies another embodiment of the invention utilizing a pressure-sensitive transistor as the transducing element. Housing member or frame 61 includes spaced apart arms 62 and 63 having a bridging portion 64. A line L2 is received through a passage defined by the upper arms 62a and 63a. The line may be clamped in a line-engaging insert 65 as by means of a thumb screw 66, as previously described. Carried on the lower portion 63b of arm 63 in a recess 67 provided therefor is a semi-conductor device 68 which is contacted by a button 69 carried on a flexible member 70. Member 70 is secured to arm 63 and extends substantially parallel therefrom and downwardly from bridging member 64 to provide an end 71 which is engaged by force-producing member 72 in the form of a stud threaded through a passage 73 on the lower portion of arm 62b. Stud 72 is locked in a given position in one of threaded passages with respect to arm 62 by a nut 72a.

Figure 6:
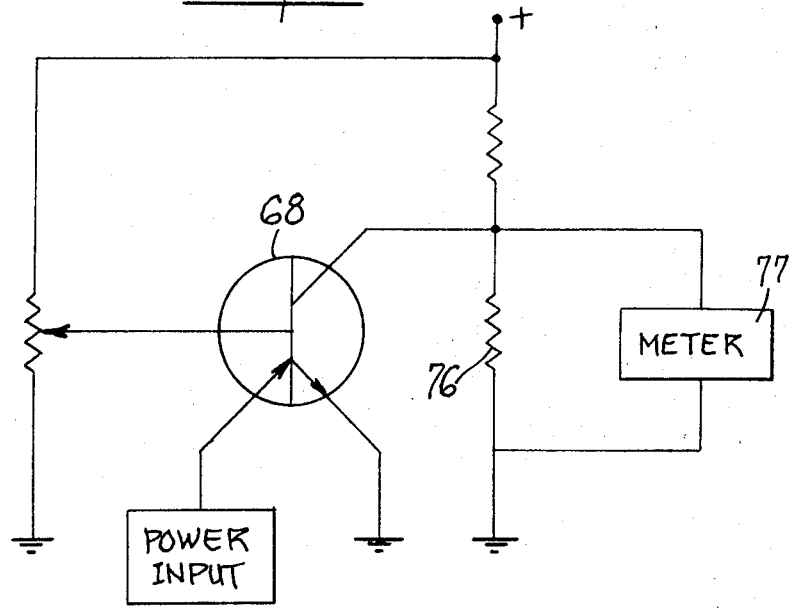
FIG. 6 is a schematic representation of the transducing element used in the arrangement of FIG. 5.

As shown in FIG. 6, the pressure sensing semiconductor 68 is essentially an NPN transistor with positive base bias which is effected by pressure applied to the base-emitter junction. Resistance 76 represents a load, and a suitable meter 77 calibrated in units of pressure may be connected thereacross to give a visual indication of the pressure exerted on transistor 68.

A suitable pressure-sensitive transducer of the type shown is availalbe from Stowe Laboratories, Inc., known as a model PT-2 Petran Piezotransistor. This transistor produces a linear output with a pressure applied to the emitter base junction.

From the foregoing disclosure it may be seen that the objects of the invention are efficiently attained. While preferred emebodiments of the invention have been set forth for purposes of disclosure, it is to be understood that other embodiments to the invention as well as modifications to the disclosed emboeiment which do not depart from the spirt and scope of the invention may become apparent to those skilled in the art. Accordingly, the appended claims are intended to cover all embodiments and modifications of the invention which do not depart from the spirit and scopre of the invention.

What is claimed is:

1. Apparatus for measuring pressure in a tubular line by detecting expansion of the line comprising a pair of spaced apart arms, a bridging member having opposite ends joined to said arms intermediate the ends thereof, said arms on one side of said bridging member defining a passage therebetween for receiving a line therethrough, coupling means on said arms for releasably clamping said member to a line through said passage, said bridging member being constructed and arranged to flex upon expansion of a line clamped in said passage, a transducer effective to produce a signal which varies as a function of a force applied thereto supported on one of said arms on the other side of said bridging member, and a force-transmitting member carried by the other of said arms on said other side of said bridging member arranged to vary the force on said transducer upon deflection of said arms.

2. The device of claim 1 wherein the point of contact of said force-transmitting member on said transducer may be selected to vary the signal output of said transducer.

3. The device of claim 2 wherein said force-producing member is movable along said other arm.

4. The device of claim 1 further including means for adjusting the position of said force-transmitting member with respect to said transducer.

5. The device of claim 1 wherein said transducer is a pressure-sensitie transistor.

6. The device of claim 1 wherein said transducer is a strain-sensitive resistance.

7. The device of claim 1 wherein said transducer comprises strain-sensitive resistance elements connected in a bridge circuit.

8. The device of claim 1 wherein said transducer comprises a beam-like peizoelectric element carried by said one of said arms.

9. The device of claim 1 wherein said coupling means includes a member slidable in one of said arms to engage a line in said passage, a pivoted cam supported from said one of said arms and arranged to engage said slidable member so that upon pivoting of said cam said slidable member is moved toward a line clamping position.

10. Apparatus for measuring the pressure in a tubular line, comprising a pair of spaced apart arms, a bridging member having opposite ends joined to and spacing said arms intermediate the ends of said arms, releasable clamping means carried on said arms on one side of said bridging member for clamping a line between said arms, said bridging member being constructed and arranged to flex upon expansion of a line in said clamping means, transducing means connected between said arms on the other side of said bridging means and responsive to deflection of said arms upon flexing of said briding member to produce a signal which varies as a function of the expansion of a line in said clamping means, said clamping means including a member movable in one of said arms to engage a line in said clamping means, a pivoted cam supported from said one of said arms and arranged to engage said slidable member so that upon pivoting of said cam said slidable member is moved toward a line clamping position.

* * * * *

PO-1050
(5/69)

UNITED STATES PATENT OFFICE
CERTIFICATE OF CORRECTION

Patent No. 3,750,475        Dated  August 7, 1973

Inventor(s)    Preston R. Weaver

It is certified that error appears in the above-identified patent and that said Letters Patent are hereby corrected as shown below:

Column 1, line 23, after "release" delete -- release --.
Column 4, line 19, after "give" insert -- a given --.
Column 4, line 61, "availalbe" should be -- available --.
Column 5, line 2, "emboeiment" should be -- embodiment --.
Column 6, line 1, "sensitie" should be -- sensitive --.

Signed and sealed this 1st day of October 1974.

(SEAL)
Attest:

McCOY M. GIBSON JR.                C. MARSHALL DANN
Attesting Officer                  Commissioner of Patents